Feb. 16, 1960  S. FÜRST  2,924,919
RACKING APPARATUS FOR PIRNS, BOBBINS AND THE LIKE
Filed May 14, 1956  6 Sheets-Sheet 1

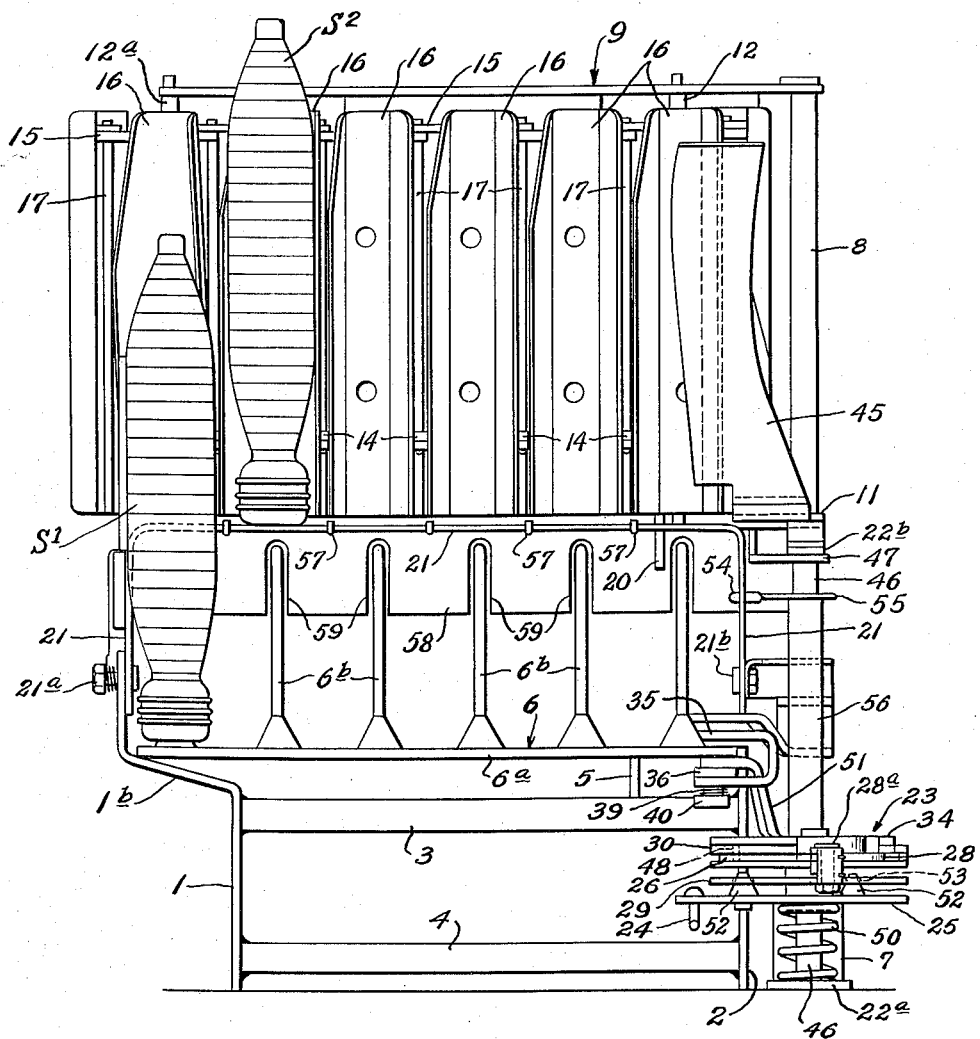

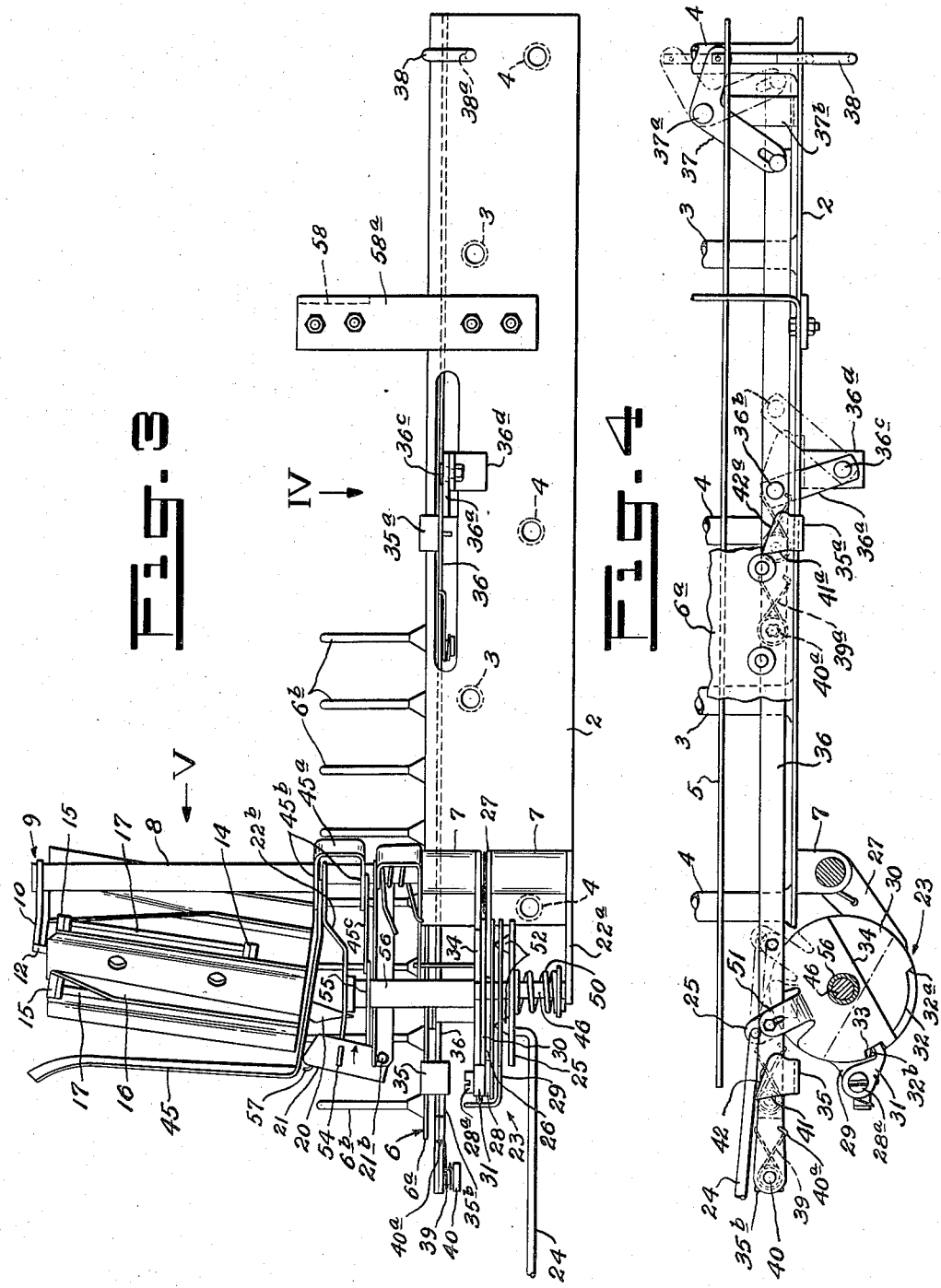

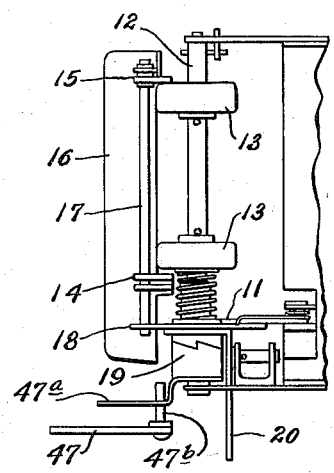
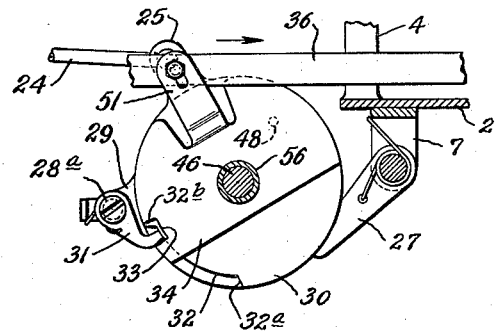
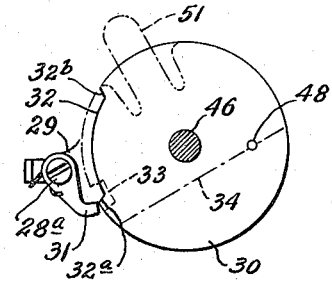
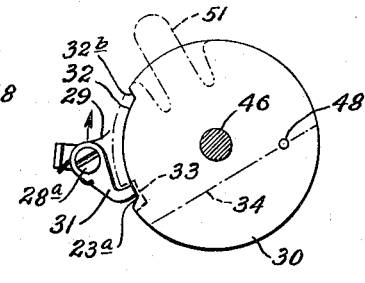
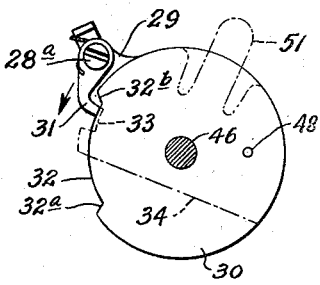
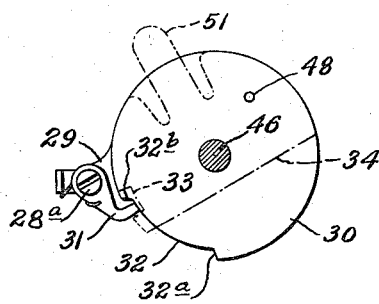
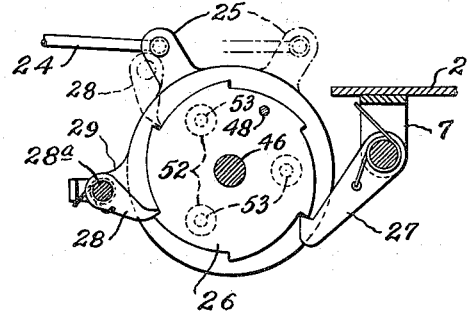

United States Patent Office 2,924,919
Patented Feb. 16, 1960

2,924,919

RACKING APPARATUS FOR PIRNS, BOBBINS AND THE LIKE

Stefan Fürst, M. Gladbach, Germany, assignor to Walter Reiners, M. Gladbach, Germany Application May 14, 1956, Serial No. 584,517

Claims priority, application Germany May 16, 1955

26 Claims. (Cl. 53—26)

The present invention relates to racking methods and apparatus for individually receiving a series of coil windings or packages such as pirns or bobbins of yarn or thread periodically delivered from a pirn or bobbin winding machine and transferring them to a storage rack in a predetermined order such that the racked pirns or bobbins may be used in exactly the same order in which they were delivered by the winding machine.

After spinning, yarn is ordinarily cross-wound into large packages each containing a very considerable length of yarn. These large cross-wound packages are thereafter subjected to further processing or treatment such as dyeing, for example, before the yarn is in condition for weaving or other textile use.

Because of inherent and unavoidable variations in the hue, color, gloss or other characteristic of the yarn contained within the same large package, it is of the utmost importance that all shorter lengths of yarn be used in exactly the same sequence in which they are rewound onto pirns or bobbins from the large cross-wound package. For example, slight but appreciable differences in color between adjacent woof threads may impair the appearance of an entire length of fabric. If, however, the shorter lengths of yarn forming the woof threads or other portions of a fabric are used in exactly the same order in which they are rewound from the large package, then adjacent threads will come from contiguous portions of the same large package and any differences in appearance between adjacent threads will be minimized. Abrupt and noticeable variations in appearance of the finished fabric may thus be avoided.

Apparatus heretofore used for this purpose has been complex, costly and of unduly limited storage capacity.

An object of the present invention is to provide a simplified and relatively inexpensive racking apparatus which is adapted to handle the entire output of an individual station of a conventional multi-station rewinding machine.

A further object of the invention is the provision of racking apparatus of this character which is actuated in synchronism with the rewinding machine by means of a mechanical connection linked to the portion of the rewinding machine which substitutes an empty pirn or bobbin for one which has just been filled and delivered.

Still another object of the invention is the provision of racking apparatus of this character wherein an empty rack may be inserted before a partially filled rack has been completely filled.

Another object of the invention is the provision of apparatus of this type which is adapted to handle storage racks comprising individual storage means for each pirn or bobbin, the storage means being arranged in transversely and longitudinally extending rows, each transverse row being filled in a single transfer operation during the course of which the storage rack is advanced longitudinally so that the next empty transverse row is then positioned to be filled.

Briefly, the apparatus comprises intermittently operative longitudinal feeding mechanism for advancing a storage rack. The rack may have storage facilities in the form of individual funnels, cups or the like to hold each pirn or bobbin, or it may comprise a series of pins on which pirns or bobbins wound on tubular cores are conveniently supported. In either case, the storage facilities are arranged in transversely and longitudinally extending rows. Each operation of the longitudinal feeding mechanism advances the storage rack by one transverse row.

Disposed above and extending along an empty transverse row of storage facilities is an intermediate temporary holder which has a capacity for the accumulation of pirns or bobbins which is equal to the storage capacity of a single transverse row of the storage rack. After the intermediate holder has been filled, its entire contents are simultaneously transferred to a single transverse row of the rack, thereby filling this previously empty transverse row. The intermediate temporary holder may advantageously comprise an endless chain conveyor which is advanced step by step during a pirn accumulating cycle in which each successive pirn is delivered to the conveyor chain of the racking device from the rewinding machine. A movable bottom is provided for emptying the conveyor so that its entire contents are simultaneously transferred to an empty row of the rack at the completion of the accumulating cycle.

It is unnecessary to advance the chain conveyor just after it has been emptied, and skip mechanism is provided which comprises a disengageable claw type clutch connected in the conveyor drive shaft for suppressing this unnecessary advance. In a modified form of the invention, the chain conveyor is advanced by mechanism which acts directly on a pirn. Thus, when the conveyor has just been emptied, no pirn is present to be acted upon and the clutch with its clutch-disengaging skip mechanism is not required.

A blocking device is provided to prevent interference with a partially filled rack when an empty rack is attempted to be inserted in the apparatus at the time when the partially filled rack is being advanced longitudinally.

A checking device is provided for assuring proper alignment of an empty rack before it can be positioned to be filled.

Various other objects, features and advantages of the invention will become apparent upon reading the following specification together with the accompanying drawing forming a part thereof.

Referring to the drawing:

Fig. 2 is a front elevational view of the device shown in Fig. 1.

Fig. 3 is a side elevational view of the device shown in Figs. 1 and 2.

Fig. 4 is a fragmentary plan view of the right hand portion of the device as viewed in Fig. 2 looking in the direction of the arrow IV in Fig. 3.

Fig. 5 is a fragmentary view in rear elevation looking in the direction of the arrow V in Fig. 3.

Fig. 6 is an enlarged fragmentary plan view of a pawl-actuated control member in the form of a partial disc, which forms a part of certain counting and stepping actuating mechanism of the device.

Fig. 7a is an enlarged plan view of a cam disc which is disposed immediately beneath the partial disc of Fig. 6 and which causes one complete angular reciprocation of the control disc member of Fig. 6 to accompany every sixth pirn delivery from the winding machine. In Fig. 7a the cam disc and its cooperating angularly reciprocating coupling pawl are shown just prior to the beginning of the sixth angular reciprocatory movement of the coupling pawl which causes an accompanying reciprocatory movement of the control member of Fig. 6.

Fig. 7b is similar to Fig. 7a and shows the disc and pawl at the beginning of the forward portion of the sixth angular reciprocatory movement of the coupling pawl.

Fig. 7c is similar to Figs. 7a and 7b and shows the disc and pawl at the completion of the forward portion and beginning of the return portion of the sixth angular reciprocatory movement of the pawl.

Fig. 7d is similar to Figs. 7a to 7c and shows the disc and pawl at the completion of the return portion of the sixth angular reciprocatory movement of the pawl.

Fig. 8 is an enlarged plan view of a ratchet disc which turns the cam disc of Figs. 7a to 7d, including a showing of the periphery of a stepping disc disposed immediately below the ratchet disc together with a partial showing of a torque limiting safety clutch disc located below the stepping disc.

Figure 9:
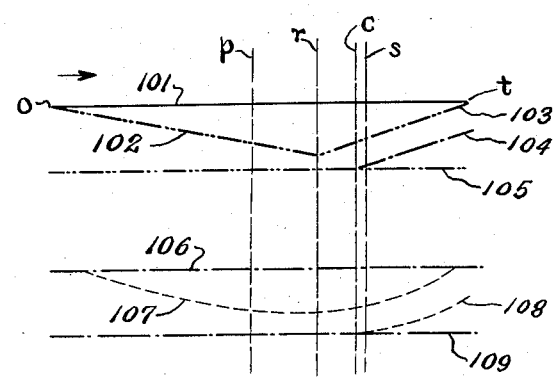

Fig. 9 is a time-motion diagram illustrating the sequence of operation of various portions of the mechanism of the device shown in Figs. 1 to 8.

Figure 10:
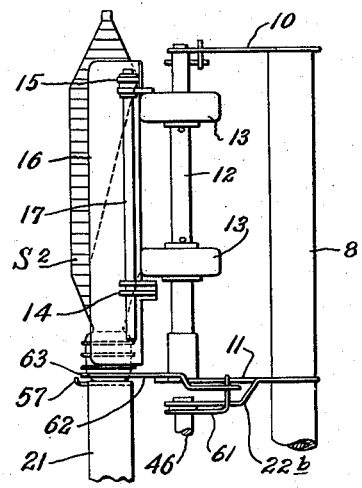

Fig. 10 is a fragmentary rear elevational view similar to Fig. 5 and illustrating a modified form of mechanism for advancing a pirn-carrying chain conveyor wherein the conveyor advancing mechanism acts on the conveyor through engagement with a pirn positioned in the conveyor.

Figure 11:
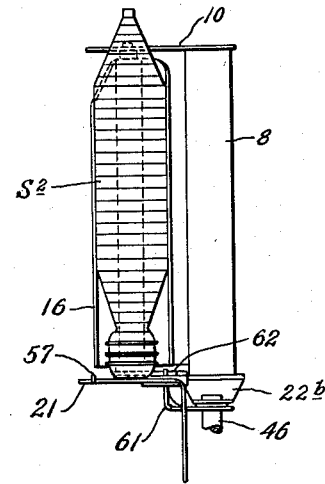

Fig. 11 is a fragmentary view in side elevation of the mechanism illustrated in Fig. 10.

Figure 12:
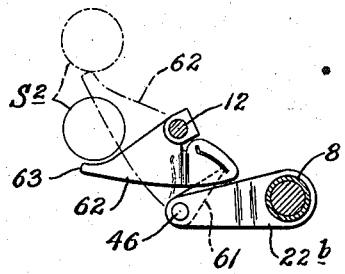

Fig. 12 is a plan view, partly in section, of the mechanism in Figs. 10 and 11.

Figure 13:
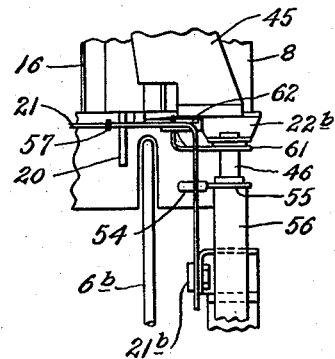

Fig. 13 is an enlarged fragmentary front elevational view generally similar to Fig. 2 but showing only details of the modified form of conveyor advancing mechanism illustrated in Figs. 10, 11 and 12.

Figure 14:
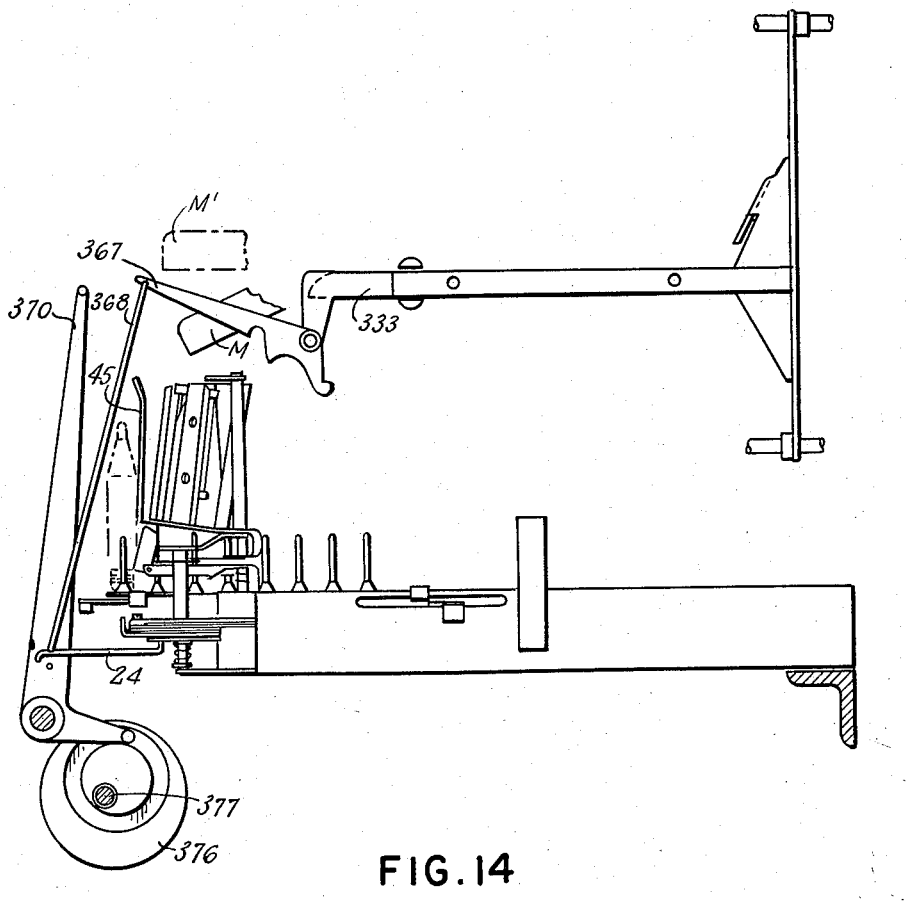

Fig. 14 is a fragmentary elevation view showing the connection of the drive rod to the push-pull control rod of a delivery station of a bobbin winding machine.

The following is a brief general description of the racking device illustrated in the drawing, a more detailed description being given at a later portion of the specification.

The racking device as shown in the drawing is arranged to be located at an individual delivery station of a pirn or bobbin winding machine, such as that illustrated and described in U.S. Patent 2,657,867 to S. Fürst, issued November 3, 1953. As a general rule, such machines ordinarily comprise a large number of separate individual winding stations arranged in a row, each station being provided with its individual delivery mechanism which successively delivers pirns, bobbins or the like, all rewound with yarn from the same large cross-wound package. As explained above, the length of yarn in the large package is so great that it will fill a large number of pirns, bobbins or the like, each containing a relatively short length of yarn.

In accordance with the present invention, the width of the racking device is approximately equal to the width of a single winding station of the pirn or bobbin-winding machine. It is to be understood that each of the several stations of a winding machine of this type is to be equipped with an individual racking device as illustrated. The racking device is preferably located somewhat below the discharge end of the winding station. In this manner, whenever an individual bobbin or pirn is fully wound and is discharged from the winding station, it may drop by gravity into the receiving portion of the racking device. For this purpose, the pirn may advantageously be guided from the winding station to the racking device by a chute or other suitable conveying apparatus (not shown).

Whenever a newly completed pirn delivered from the winding station arrives in the racking device, it drops into a receiving space 16' formed by an upwardly-downwardly extending trough-shaped element 16 of a chain conveyor and a movable shield 45 which is normally positioned in front of the conveyor. A series of the trough elements 16 are linked together to form an endless conveyor chain which is moved horizontally one step at a time. The empty space at 16' is that of the first conveyor trough element located at the right-hand side of Fig. 2. The trough elements are also termed receivers. After a newly delivered pirn has been dropped into the receiving space 16' between the particular trough 16 which is at that time positioned immediately behind the shield 45, the chain conveyor advances by a single step so that the next following empty trough element 16 is located in pirn receiving position behind the shield 45. Thereafter, the chain of trough elements advances by a single step at a time so that the next following pirn will drop into the empty third trough element 16 which is then positioned behind the shield 45. This process is continued until all six trough elements 16 located in the front portion of the chain conveyor have been filled, thus accumulating a total of six pirns. Thereafter, the flat conveyor bottom closure member 21, which as will be described in greater detail below is formed in the shape of an inverted stirrup, moves backwardly beneath the conveyor and away from the observer as viewed in Fig. 1 so that all six pirns are simultaneously dropped upon an empty row of pins of the storage rack disposed directly below the chain conveyor. The endless chain of trough elements 16 thus forms a temporary intermediate holder or storage magazine interposed between the winding machine delivery mechanism and the removable storage rack in which a relatively large number of pirns are held prior to use.

In the embodiment of the invention which is illustrated herein, a total of six pirns are cyclically accumulated in the chain conveyor in the exact sequence in which they are delivered from the winding machine before they are simultaneously transferred to a single transverse row of receiving spaces on the storage rack.

Figure 1:
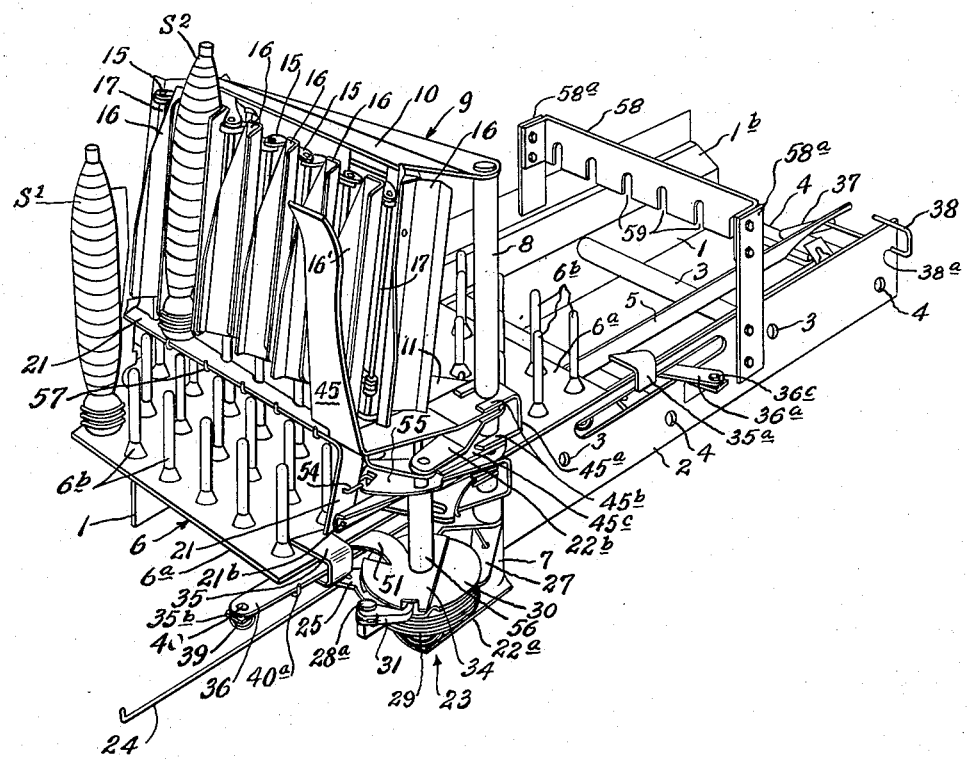
Fig. 1 is a general perspective view of a pirn racking device in accordance with the invention.

Referring to Fig. 1 in greater detail, the storage rack is designated generally as 6. The storage rack 6 illustrated comprises a rectangular sheet metal base plate 6a which is provided with eight longitudinally-spaced transverse rows of upright pins 6b, each transverse row comprising a total of six pins. When a total of six pirns has been accumulated in the chain conveyor, the six pirns are simultaneously released and dropped by gravity from the intermediate holder, designated generally as 9, as described above, so that they drop with their tubular cores or quills each surrounding and mounted upon one of the six pins 6b of the first transverse row of pins. For clarity of illustration of details of construction of other portions of the device, only a single pirn $S_1$ is shown positioned on one of the pins 6b of the first transverse row of the storage rack 6 and, similarly only a single pirn $S_2$ is shown occupying the fifth position in the conveyor chain of the intermediate holder.

When the first row of pins of the storage rack 6 has thus been filled with consecutively arranged pirns, the storage rack 6 is advanced longitudinally by one step toward the left as viewed in Fig. 1 so that the next transverse row of pins 6b is placed in position to receive the next group of six pirns accumulated in the intermediate holder 9. Thereafter, the intermediate holder 9 is refilled successively in the same manner described above and the next accumulated group of six pirns is then dropped upon the next transverse row of empty pins 6b. This operation is repeated cyclically until all eight rows of pins on the storage rack 6 have been filled. The filled rack 6 can then be removed, and an empty storage rack can then be positioned to be filled in the same manner.

It will be apparent from the foregoing that each completely filled storage rack 6 contains a series of pirns or bobbins arranged consecutively in a predetermined order, namely such that the first bobbin received from the winding machine is located at the right end of the first transverse row as viewed in Fig. 1, that is, behind shield 45, and that all subsequently delivered bobbins follow each other disposed on consecutive transverse rows of pins, always arranged in the same order from right to left as viewed in Fig. 1. This makes it possible to use the pirns in exactly the same order in which they were delivered from the winding machine, thereby avoiding abrupt changes in any characteristic such as color, gloss, lustre or the like, such variations being inherent in the large cross-wound package of yarn which is being rewound on individual pirns.

The supporting frame structure of the device comprises two longitudinally extending flat sheet metal side plate members 1 and 2 which are rigidly connected with each other by upper and lower transverse bracing bars 3 and 4 respectively. A longitudinally extending fixed guide rail 5 (Figs. 1, 2, 4) is carried by the upper cross bars 3 and forms a support for one side of the base plate 6a of the storage rack 6, whereby the rack 6 is longitudinally, slidably supported. The storage rack 6 is also longitudinally slidable upon a laterally inwardly sloping shelf portion 1b of the side plate member 1, as well as on the longitudinal rail 5. The left-hand edge of base plate 6a rests on the sloping shelf portion 1b. This has the effect of maintaining the right-hand edge of the base plate 6a (as viewed in Fig. 1) in positive rectilinear guiding engagement with the inner upper portion of side plate 2, thus forming a runway for advancing the storage rack 6. A bracket 7 (Figs. 1, 2, 3) is mounted on the side plate 2 and supports an upright rod 8, at the upper portion of which the intermediate holder 9 is mounted.

The intermediate pirn accumulating holder 9 comprises spaced upper and lower frame members 10 and 11 extending transversely across the runway 1b, 5, 2. Two generally vertically extending horizontally spaced shafts 12 and 12a (Figs. 2, 3, 5) are journaled in the frame members 10 and 11. The shafts 12 and 12a are upwardly and rearwardly inclined, preferably at an angle of about 15 degrees with respect to the vertical, so that the pirns in the front six trough members 16 of the conveyor chain will be recliningly retained therein. Each of the shafts 12 and 12a carries two vertically spaced rollers 13 (Fig. 5) which engage and support the chain conveyor formed of trough elements 16. The rollers 13 are in contact with lower and upper chain link members 14 and 15 (Figs. 2, 3, 5) on which the individual trough elements 16 are mounted. The trough elements 16 are pivotally linked together laterally by vertical connecting pins 17. A rotatable star wheel 18 (Fig. 5) is fixedly mounted on the shaft 12 and is connected with the upper member of a claw-type one-way slip clutch 19. When the star wheel 18 is turned through one-quarter of a revolution, the conveyor chain of trough elements 16 is advanced by one step which corresponds to the horizontal width of a single individual trough element 16. The shaft 12 is laterally movably journaled in the sheet metal frame members 10 and 11 in horizontally elongated slots and is spring-biased by means (not shown) so that it is yieldingly urged away from the shaft 12a, thereby maintaining the conveyor chain of trough elements 16 continuously in a taut condition.

Provision is made for disengaging the upper claw member of clutch 19, a control lever 20 being provided, such that the upper claw member is lifted out of engagement with the lower claw member (Figs. 2, 3, 5). As mentioned above, the common bottom portion of the six trough elements 16 in the front portion of the conveyor chain is formed by the horizontally extending top of an inverted stirrup member 21 (Figs. 1, 2, 3). The inverted stirrup 21 is pivoted at 21a and 21b (Figs. 2, 3) so that it can be rotated rearwardly (to the right as viewed in Fig. 1) about a horizontal axis. When thus rotated, the stirrup or release member 21 moves beneath the chain conveyor so that the bottoms of the front six trough elements 16 then located in the front portion of the conveyor chain are simultaneously opened for releasing the six accumulated pirns. During the course of this rearward releasing movement of the stirrup 21, the rear edge thereof engages the clutch disengaging control lever 20 (Figs. 2, 3) and entrains the lever 20 temporarily disengaging the cooperating claw members of clutch 19 during the course of the return movement of the stirrup member 21 so that the clutch 19 skips one tooth, as explained in detail below.

Lower and upper fixed brackets or bearing plates 22a and 22b (Figs. 1, 2, 3) are supported by the bracket 7 and a counting and stepping mechanism designated generally 23 is mounted intermediate plates 22a and 22b. The stepping mechanism 23 is connected for actuation by a periodically reciprocating drive rod 24 through a torque limiting safety clutch comprising a clutch disc 25 (Figs. 2, 3). The stepping mechanism 23 includes both counting and control mechanism. The counting and control mechanism comprises a six lobe ratchet disc 26 (Figs. 2, 8) actuated in stepwise fashion by an arcuately moving reciprocatory pawl 28 which successively engages the teeth of the ratchet disc 26. A retaining detent 27, mounted on a stationary pivot, retains the ratchet disc 26 against reverse movement. The stepping pawl 28 is mounted on a vertical pivot pin 28a and the detent 27 is similarly mounted on a fixed pivot pin. Both the stepping pawl 28 and detent 27 are biased for engagement with the ratchet disc 26 by respective individual torsion springs each surrounding one of the pivot pins.

The pivot pin 28a of pawl 28 is mounted on a stepping disc 29 which periodically rotates through a limited angular displacement in a reciprocatory manner, being driven by the clutch disc 25. For each complete reciprocatory movement of the drive rod 24 which accompanies each bobbin exchange in the winding machine, the stepping disc 29 is caused to make a complete angular reciprocatory movement consisting of an initial forward clockwise portion (as viewed in Fig. 8) followed by a quick return counterclockwise movement. During the initial portion of this movement the stepping pawl 28 travels idly in a clockwise direction and engages behind the next tooth of ratchet disc 26, the ratchet disc 26 being held against clockwise rotation by the detent 27. During the quick return pull portion of the reciprocatory movement of drive rod 24, the stepping pawl 28 drives the ratchet disc 26 counterclockwise through a single tooth interval so that it is effectively advanced through an angular displacement of 60°.

Disposed immediately above the ratchet disc 26 and connected thereto by a vertical pin 48, is a cam disc 30 (Figs. 2 and 7a to 7d). The cam disc 30 has an arcuate recess 32 formed in its periphery, the recess 32 being provided with inclined leading and trailing end edges 32a and 32b, respectively. A spring biased coupling pawl 31 is mounted on pivot pin 28a along with stepping pawl 28. Except in one of the six positions of ratchet disc 26, the coupling pawl 31 rides on the periphery of cam disc 30. The vertical width of coupling pawl 31 is such that it extends upwardly for engagement in a steep-sided latching recess or notch 33 formed in the periphery of a control disc 34 (Figs. 1, 2, 6). The control disc 34 is shown cut away along a chord for economy of material, since the cut-away portion serves no useful purpose. The latching recess or notch 33 in control disc 34 provides means for entraining the control disc 34 with the stepping disc 29 during every sixth reciprocatory movement of the stepping disc 29.

The operation of coupling pawl 31 is illustrated in Figs 7a to 7d. Just prior to the beginning of the sixth reciprocation of drive rod 24, the pawl 31 rests on the periphery of cam disc 30 immediately adjacent to the leading edge 32a of the arcuate cam recess 32. As soon as the forward movement of stepping disc 29 commences, the pawl 31 immediately rides down the leading edge 32a as shown in Fig. 7b so that it enters into recess 32 and notch 33 simultaneously, these recesses then being in register. Cam disc 30, which is connected to ratchet disc 26 by pin 48, is restrained against forward clockwise movement by the detent 27. Accordingly, during the forward portion of the reciprocatory movement, pawl 31 rotates control disc 34 in a clockwise direction by engagement in notch 33 while it moves clockwise in the elongated arcuate recess 32 from its leading end at edge 32a to its trailing end at edge 32b. At the conclusion of the forward movement, the pawl 31 is positioned as shown in Fig. 7c, being still engaged in the notch 33 while positioned at the trailing end of recess 32 adjacent to edge 32b. During the counterclockwise return movement, the pawl 28 drives both the ratchet disc 26 and cam disc 30 through one step so that pawl 31 remains at the trailing end of recess 32 while returning control disc 34 in the counterclockwise direction to its initial position. At the conclusion of the return movement the pawl 31 and cam disc 30 are positioned as shown in Fig. 7d with pawl 31 at the trailing end of recess 32. At the beginning of the first forward movement of the next six-step pirn accumulating cycle, the pawl 31 rides up the sloping trailing edge 32b of recess 32 and out of notch 33, so that it cannot engage the trailing edge of notch 33. Thereafter, and during the first five reciprocatory movements of stepping disc 29 in the course of the next six-step cycle, the coupling pawl 31 rides on the periphery of cam disc 30 and cannot enter the notch 33 until the parts have again arrived in the relative positions shown in Fig. 7a prior to the beginning sixth step of the cycle. The notch 33 is wider than the circumferential thickness of pawl 31, thus providing a certain amount of lost motion. This lost motion provides a gap which permits pawl 31 to enter freely into notch 33 at the beginning of the sixth step as it rides down the inclined leading edge 32a of recess 32 and engages the trailing edge of notch 33. During the return movement pawl 31 engages the leading edge of notch 33. This provides a space permitting pawl 31 to ride up the sloping trailing edge 32b of recess 32 without engaging the trailing edge of notch 33 at the beginning of the first step of each six-step cycle.

The rack 6 is periodically advanced by one transverse row of pins at a time immediately following operation of discharge stirrup 21 to fill a previously empty row. For this purpose, two longitudinally spaced spring-pressed latches 35 and 35a (Figs. 1, 2, 4) are provided. The latches 35 and 35a are mounted on a longitudinally extending rail 36 which, in turn is mounted for longitudinal reciprocation on a horizontal link 36a. One end of link 36a is connected to the rail 36 by a pivot pin 36b (Fig. 4). The other end of link 36a is connected by a pivot pin 36c to a bracket 36d. The bracket 36d is welded or otherwise fixed to the side plate 2 of the machine frame.

The rear end of rail 36 is connected to the slotted outer end of a horizontal bell-crank lever 37 (Fig. 4). The bell-crank lever 37 is mounted on a vertical pivot pin 37a disposed at the inner end of a fixed horizontally extending supporting bracket 37b. Bracket 37b is secured to side plate 2 of the machine frame. The end of the rearwardly extending arm of bell-crank lever 37 is connected to the elongated lower leg of a U-shaped blocking member 38 which is freely reciprocable transversely of the machine frame, the lower leg being guided by passage through a hole 38a (Fig. 3) formed in side plate 2 of the machine frame. The short upper leg of U-shaped blocking member 38 extends inwardly over the upper edge of the side plate 2. When the latch-carrying rail 36 is forced rearwardly and then pulled forwardly in a manner later to be described, the short upper leg of U-shaped blocking member 38 projects into the longitudinal path of rack travel. This obstructs the path of rack travel thereby preventing the insertion of an empty rack 6 during the time when a partially filled rack is being advanced to position an empty transverse row of pins 6b below the conveyor discharge stirrup 21. Otherwise, except during this comparatively short time interval, an empty storage rack may be positioned in the machine as soon as the partially filled rack has advanced forwardly by a sufficient distance to provide the required space for its accommodation.

Advantageously, the distance from the center line of each transverse end row of pins 6b to the adjacent end edge of the rack base plate 6a is equal to or slightly less than the one-half the distance between the center lines of adjacent transverse rows of pins. Thus, when two racks 6 abut each other end-to-end, a uniform spacing of transverse rows of pins will be maintained from rack to rack. The spacing between the two latches 35 and 35a is equal to or slightly greater than an integral multiple of the spacing between the center lines of adjacent transverse rows of pins so that they may simultaneously engage the end pins of two different transverse rows either of the same rack or of two abutting racks. This permits an empty rack to be advanced simultaneously along with a partially filled rack so that the empty rack may be placed in the machine in readiness to be filled, well in advance of the time when it is actually needed.

The latch 35 comprises an elongated forwardly extending leg portion 35b of substantially the same width as the rail 36. This leg portion extends along the under side of the rail 36. At its forward end, the leg portion 36b is connected to rail 36 by a pivot pin 40. A scissors-like torsion spring 39 is wound around pivot pin 40 and is provided with upwardly turned free ends 40a which simultaneously embrace opposite lateral edges of the rail 36 and of the leg portion 35b of latch member 35. The leg portion 35b of latch member 35 is thus normally held in alignment with the rail 36 but is displaceable from its normal aligned position against the yielding action of torsion spring 39. When latch member 35 is moved rearwardly, its sloping lateral edge 42 engages and is pressed outwardly by the end pin 6b of the next rearwardly disposed transverse row. This continues until latch 35 has passed this next pin whereafter it is restored to its normal position by torsion spring 39. In its normal position, its forward edge 41 is disposed behind this next pin so that upon the next forward movement of rail 36, the rack 6 will be pulled forwardly by engagement of the forward edge 41 of latch 35 behind the pin which it has previously passed in the course of its immediately preceding rearward movement.

The rearwardly disposed latch 35a is similarly mounted on a pivot pin 40a (Fig. 4) and is yieldingly urged to its normal position by a torsion spring 39a and is provided with forward and lateral edges 41a and 42a, respectively. The operation of latch 35a is similar in all respects to that of latch 35, described above.

Near its forward end and behind the latch member 35, the rail 36 is pivotally connected to a radially outwardly extending arm 51 formed integrally with the control disc 34. The arm 51 is offset so that its outer end portion is disposed above the flat body portion of control disc 34. In this manner, in the course of a rotary reciprocation of control disc 34 as described above, the rail 36 is caused to make one complete longitudinal reciprocation accompanying every sixth reciprocation of the drive rod 24. This, in turn, advances the rack 6 by a single transverse row of pins 6b bringing the next empty row of pins into filling position beneath the conveyor discharge stirrup 21. During this time, the rear end of the racking device is obstructed by the upper leg of U-shaped blocking member 38 to prevent the insertion of an empty rack at the particular time when a partially filled rack already in the machine is in the process of being advanced.

The clutch disc 25 is freely rotatable and axially movable on the vertical shaft 46 (Figs. 1, 2, 3). The stepping disc 29 is fixed on the shaft 46. This arrangement permits relative rotary movement of clutch disc 25 and stepping disc 29. The clutch disc 25 has an integrally formed radially extending arm. One end of drive rod 24 is turned upwardly to extend through an aperture in the arm of clutch disc 25, this end of drive rod 24 being headed for retaining it in the arm of clutch disc 25.

The clutch disc 25 is pressed upwardly by a helical compression spring 50 (Figs. 2, 3) which surrounds the vertical shaft 46. The lower end of spring 50 rests on the bearing plate 22a. The clutch plate 25 carries three upwardly extending conical bosses 52 (Figs. 2, 8). The stepping disc 29 is provided with three cooperating recesses 53 (Fig. 8) in which the bosses 52 are disengageably received.

The torque-limiting safety clutch connection between discs 25 and 29 also protects against overload imposed on portions of the mechanism operated both by shaft 46 and by the hollow shaft 56 surrounding shaft 46 and which is fixed to and extends upwardly from the control disc 34. Shaft 56 is coupled to stepping disc 29 through coupling pawl 31 during every sixth step of each pirn accumulating cycle and is thus driven by drive rod 24 through the torque-limiting clutch disc 25. In the event of a mechanical overload, such as the stoppage of an advancing empty storage rack by the alignment checking device comprising plate 58 described below, the bosses 52 will be forced out of recesses 53 against the pressure of spring 50 thereby protecting the mechanism against damage.

The shield 45 is rotatably mounted on the upright post 8, immediately above the fixed supporting bracket 22b (Fig. 1) in which the upper end of shaft 46 is journaled. A U-shaped coupling member 45a with bifurcated ends 45b connects the shield 45 rigidly with an actuating arm 45c fixed to the lower horizontal leg of U-shaped member 45a. The arm 45c is in actuating engagement with the rotatable member 55 which, in turn, is fixed to the upper end of hollow shaft 56. Thus, during each reciprocatory rotational movement of hollow shaft 56, which occurs during every sixth step of each pirn accumulating cycle, the shield 45 will be moved toward the right as viewed in Figs. 1 and 2 to clear the way for forward movement of the last-delivered pirn during the forthcoming advancing movement of storage rack 6 by which the last-delivered pirn will then be carried. The return movement of shield 45 takes place during the final portion of the return movement of hollow shaft 56 so that it is restored to its normal position as shown in the drawing just behind the previously racked advancing last-delivered pirn. This positions the shield 45 in readiness to receive the first-delivered pirn of the next accumulating cycle.

A series of spacer elements 57 is mounted on the stirrup 21. The spacer elements 57 clear the bottoms of the trough elements 16 so that they cannot interfere with advancing movement of the conveyor chain. In the normal position of stirrup 21 the spacer elements 57 also clear the bases of the pirns. During retraction of the stirrup 21, however, the spacer elements 57 hold the bases of the pirns in alignment with the pins 6b notwithstanding some slight advancing movement of the chain conveyor.

Referring to the time-displacement diagram of Fig. 9 the top solid horizontal line 101 is the time axis. Each complete reciprocatory movement of drive rod 24 commences at time $o$ and terminates at time $t$. The reversal of movement during every step of the six-step accumulating cycle takes place at time $r$. The forward or push movement of drive rod 24 is indicated by the downwardly inclined dash-double-dot line 102 and the relatively rapid quick return movement by the upwardly inclined dash-double-dot line 103.

A newly delivered pirn arrives in the chain conveyor at time $p$ which is at the expiration of about two-thirds of forward interval from $o$ to $r$. This occurs during every reciprocatory movement of drive rod 24 and thus during every step of each accumulating cycle.

During the first five steps of each accumulating cycle, the chain conveyor comprising trough elements 16 advances by one step beginning at the time $c$ shortly after the beginning of the return movement at time $r$. This is indicated by upwardly inclined dot-dash line 104. During each sixth step, however, the chain conveyor remains stationary by disengagement of clutch 19 and this is indicated by the short horizontal dashed line 105.

During the first five steps, the stirrup member 21 remains stationary. This is indicated by the horizontal line 106. During the sixth step, it moves backwardly beneath the chain conveyor during the forward portion of the step as indicated by the downwardly bowed curved line 107. The sixth pirn is delivered before the stirrup 21 is fully retracted and it rests briefly on the stirrup member from time $p$ until about time $r$ or shortly before time $r$ when the reverse movement begins.

The storage rack 6 is advanced by latches 35, 35a during every sixth step beginning at time $s$ shortly after the time $c$ when the conveyor chain advances. This is indicated by the upwardly directed line 108. During the first five steps it remains stationary as indicated by the horizontal line 109.

A transversely extending vertical plate 58 is positioned behind the pirn accumulating temporary holder 9. The plate 58 is supported on uprights 58a fixed to side plates 1 and 2 of the frame. There are six vertically extending slots 59 formed in the plate 58. The slots 59 are closed at the top and open at the bottom. The slots 59 are so positioned that they will prevent passage of a storage rack 6 unless all six of its pins 6b in every transverse row are properly aligned to receive a group of six pirns from the trough elements 16 of the chain conveyor.

In the modified form of the invention as illustrated in Figs. 10 to 13, the arm 47 (Fig. 2) which advances the conveyor chain through clutch 19 (Fig. 5) is replaced by an arm 61 fixed to upper end of shaft 46 (Fig. 10). The arm 61 is provided with an upwardly projecting free end. The upper end of shaft 46 is shown journaled in a bracket 22b fixed to the upright supporting rod 8 as in Figs. 1 to 8. A pusher member 62 having a tip 63 is pivotally mounted on the conveyor shaft 12 and is engaged by the upwardly projecting free end of arm 61. Each time a pirn is delivered to the conveyor chain the shaft 46, as viewed in Fig. 12, makes a forward clockwise movement along with stepping disc 29 immediately followed by a counterclockwise return movement. The upwardly projecting free end of arm 61, at the completion of the forward movement, assumes the position shown in solid lines along with the pusher member 62. This clears the bottom of the first position conveyor trough element 16 for the reception of a newly delivered pirn. If the pirn is received and immediately discharged to the storage rack 6 before commencement of the return movement, then the first position trough element will be empty and the tip 63 of pusher member 62 will encounter nothing in the course of its return movement. This causes the conveyor to skip an advancing movement when it is empty.

At the beginning of the next six-step cycle, however, the tip 63 of pusher member 62 will engage the base of the first newly delivered pirn during its return movement to the position shown in dotted lines in Fig. 12. This advances the pirn toward the left in Figs. 1 and 2 by the width of a single trough element 16 and the leftwardly moving pirn entrains the conveyor chain thus causing the entire chain to advance by the width of a single trough element. This conveyor advancing movement is repeated successively until six pirns have been accumulated and have been simultaneously delivered to the storage rack 6. After each sixth step of the pirn accumulating cycle there is no pirn in the first conveyor trough element to be acted upon by the pusher member 62, and an unnecessary advance of the conveyor chain is thus omitted.

Fig. 14 illustrates how arm 24 is coupled with the reciprocating member 370 of a delivery station of a bobbin winding machine. Member 370 corresponds to member 70 of U.S. Patent 2,657,867 issued to S. Fürst, which illustrates and describes such a station. Member 333 corresponds to control bar 33 of that patent, cam 376 corresponds to cam 76, shaft 377 corresponds to shaft 77, pawl lever corresponds to element 67, and trough M corresponds to that of the aforementioned patent. Arm 24 of the racking apparatus is coupled with the swing arm 370 and simultaneously with latch pawl 367 by means of linking rod 368. As the cam 376 of the winding machine rotates and control bar 333 reciprocates, pawl lever 367 causes rod 24 to engage swing arm 370 and to reciprocate therewith, as above described, in synchronism with the pirn delivery mechanism of the rewinding machine.

In operation, let it be assumed that the racking device is completely empty and that the coil winding station has just finished winding the first pirn. Then the pirn suitably guided by a chute or other guide means, drops into the empty space 16' (Fig. 1) of the first conveyor trough element located at the right-hand side of Fig. 2. As mentioned above, the shield 45 is then effective to prevent the pirn from tumbling out of the trough space 16' in which it has just been received from trough M (Fig. 14). Trough M corresponds to trough M of the aforementioned U.S. Patent 2,657,867 to S. Fürst. During the intervening winding period while the next pirn is being completed by the rewinding machine, all parts of the racking device remain at rest. At the end of this winding operation, the coil changing device of the winding station is temporarily effective and imparts a single rearward and return push-pull movement to the drive rod 24 (Figs. 1, 2, 4 and 14). This single reciprocation is imparted to and transmitted through the stepping mechanism 23. The forward pushing movement of drive rod 24 rotates the clutch disc 25 in a clockwise direction from the position shown by solid lines in Fig. 8 into the position shown in dot-and-dash lines. The immediately subsequent forward pull movement returns clutch disc 25 to its starting position. During this rotary reciprocation of clutch disc 25 the bosses 52 entrain the stepping disc 29 on which the common pivot pin 28a of stepping pawl 28 and coupling pawl 31 is mounted. The pawl 28 turns the ratchet disc 26 through one tooth division during the return pull movement of drive rod 24 and the detent 27 prevents a return movement of the ratchet disc 26 during the forward push movement. The reciprocatory motion of the stepping disc 29 driven by clutch disc 25 is transmitted through a vertical shaft 46 (Fig. 2) to a crank arm 47 (Figs. 2, 5) and thence to an arm 47a (Fig. 5) connected to the lower claw of the clutch 19. Through clutch 19 this movement is imparted to the star wheel 18 and to the conveyor chain of trough elements forming the temporary holder 9. The conveyor chain is thus advanced one step corresponding to the horizontal width of an individual trough element during the return movement, the forward movement being taken up by slippage of the clutch 19 by one tooth.

As explained above, during the sixth step of the pirn accumulating cycle, the pawl 31 entrains the control disc 34 and moves it forward and back. This single reciprocation of the control disc 34 during the sixth step also causes the feed control rail 36 to perform a single longitudinal reciprocation, thus advancing the pin board 6 one step. The control disc 34 also controls the movement of the stirrup 21 (Figs. 1, 3)). This control is effected by a link member 54 (Figs. 1, 2) and a rotatable member 55 which is connected with the control disc 34 by a hollow shaft 56 (Figs. 1, 2, 3, 4). As explained, each step of the pirn accumulating cycle occurs when a newly completed pirn is supplied to the racking device from the coil winding station.

After completion of the first five steps, the next following pirn will provide an accumulation in upper holder 9 sufficient to fill the first row of pins on the storage rack 6 below. Consequently, the temporary holder 9 can now be emptied. This is effected by the retraction of the stirrup 21 rearwardly so that it is drawn back beneath the conveyor chain. Since due to the discharging of the temporary holder the first trough space (16' in Fig. 1) becomes available for receiving a new pirn, the chain of troughs need not perform a stepping movement during the sixth step of the cycle. The movement of the chain of troughs during the sixth step is prevented by the clutch disengaging control lever 20 (Figs. 2, 3) which is actuated as soon as the rearwardly moving stirrup 21, during emptying of the trough spaces, abuts against the lever 20 and thus raises the upper claw of clutch 19 so that it skips one tooth during the return portion of the sixth step when the conveyor chain would otherwise be advanced.

It will be understood that the pin boards may be provided with a different number of pins in each row and also with a different number of rows than described in the foregoing with reference to the illustrated embodiment. It will further be recognized that instead of using pins for collecting the hollow-cored pirns in the main magazine, the collecting the hollow-cored pirns in the main magazine, the collecting means of the storage rack 6 may be given a different design, for instance of funnel shape, depending upon the particular design and shape of the pirns or bobbins.

Further modifications will be obvious to those skilled in the art upon a study of this disclosure and it will therefore be understood that the invention can be embodied in specific devices other than the one illustrated and described herein, without departing from the essential features of my invention and within the scope of the claims annexed hereto.

I claim:

1. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a longitudinally extending series of transverse rows of pirn-receiving means, said apparatus comprising means for longitudinally movably supporting said rack, temporary holding means for receiving a group of pirns successively delivered in order of winding from said rewinding machine, said holding means having a pirn-holding capacity equal to the storage capacity of one of said transverse rows, transfer means for simultaneously transferring the entire contents of said holding means when filled to capacity to a single empty transverse row of said rack, means for advancing said rack longitudinally following operation of said transfer means to position the next empty transverse row of receiving means to be filled from said holding means by said transfer means, reciprocable drive means operating in synchronism with the pirn delivery mechanism of said rewinding station on the rewinding machine, said drive means including means connected with said holding means for arranging successively delivered pirns in a predetermined order therein, and actuating means operative upon the filling of said holding means to its capacity and connected to operate said transfer means and said rack-advancing means for filling successive transverse rows of said rack.

2. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a longitudinally extending series of transverse rows of individual pirn-receiving means, said apparatus comprising a frame, elongated supporting means carried by said frame for longitudinally movably supporting said rack, temporary holding means carried by said frame and extending transversely of said supporting means for receiving successive pirns from said winding station, said holding means having a pirn-holding capacity equal to the storage capacity of one of said transverse rows, transfer means disposed intermediate said holding means and said supporting means for simultaneously transferring the entire contents of said holding means when filled to capacity to a single transverse row of said rack, means for advancing said rack longitudinally by the distance between successive transverse rows following each operation of said transfer means to position the next empty transverse row of receiving means to be filled from said holding means by said transfer means, movable means included in said holding means for positioning said pirns transversely of said rack in register with the receiving means of said transverse rows, drive means operating in synchronism with the pirn exchange mechanism of said rewinding station of the rewinding machine, said drive means including means connected with said movable means for arranging successively delivered pirns in a predetermined order in said holding means, and actuating means operative upon the filling of said holding means to its capacity and connected to operate said transfer means and said rack-advancing means for filling successive transverse rows of said rack.

3. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a longitudinally extending regularly spaced series of transverse rows of regularly spaced pirn-receiving and positioning means, said apparatus comprising a machine frame including a runway for longitudinally movably supporting said rack therein, temporary holding means extending transversely across said runway for receiving successive pirns from said rewinding machine, said holding means having a pirn-holding capacity when filled which is equal to the storage capacity of a single transverse row of said rack, transfer means disposed intermediate said holding means and said runway for simultaneously transferring the entire capacity of said holding means to a single empty transverse row of said rack, means for advancing said rack longitudinally of said runway by the distance between successive transverse rows of said rack following each operation of said transfer means to position the next empty transverse row of positioning means to be filled from said holding means at the next operation of said transfer means, movable receiving means included in said holding means, said movable means including a series of individual receptacles for receiving successive pirns delivered by said rewinding machine, said receptacles being positioned in register with said positioning means of said transverse rows, drive means operating in synchronism with the pirn delivery mechanism of said winding station of the rewinding machine, said drive means including means connected with said movable means for arranging successively delivered pirns in a predetermined order in said receptacles, and actuating means operative upon the filling of said receptacles to the capacity of said holding means and connected to operate said transfer means and said rack advancing means for filling successive transverse rows of said rack.

4. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a regularly longitudinally extending series of transverse rows of regularly spaced pirn-receiving means, said apparatus comprising means for longitudinally movably supporting said rack, stepwise actuated means for advancing said rack longitudinally of said supporting means, temporary holding means including a chain conveyor for receiving successive pirns from said rewinding machine, said chain conveyor comprising a portion having a pirn-holding capacity equal to the storage capacity of one of said transverse rows, transfer means for simultaneously transferring the entire contents of said chain conveyor portion to a single transverse row of said rack, drive means operating in synchronism with the pirn delivery mechanism of said rewinding station on the rewinding machine, said drive means including means connected with said holding means for advancing said chain conveyor to receive successively delivered pirns in consecutive adjacent positions in said conveyor portion, and actuating means operative upon the advancing of said conveyor portion by an amount corresponding to the filling of said holding means to its capacity and connected to be operated by said drive means, said actuating means being further connected to operate said transfer means and said stepwise actuated means for filling successive transverse rows of said rack.

5. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a regularly spaced longitudinally extending series of transverse rows of regularly spaced upright pins carried by a base plate, said apparatus comprising a machine frame including a runway for longitudinally movably supporting and guiding said rack therein, stepwise actuated means including latch means engageable with said upright pins for advancing said rack longitudinally of said supporting means, temporary holding means extending transversely above said runway and including a chain conveyor comprising a series of inclined trough elements for recliningly receiving successive pirns from said rewinding machine each in one of said trough elements, said chain conveyor comprising a portion having a pirn-holding capacity equal to the storage capacity of one of said transverse rows and consisting of a series of trough elements in register with the pirns of said transverse rows, transfer means comprising a movable bottom closure member for said series of trough elements for simultaneously dropping the entire contents of said chain conveyor portion upon a single transverse row of pins of said rack by displacement of said closure member, reciprocable drive means operating in synchronism with the pirn delivery mechanism of said rewinding machine, said drive means including means connected with said holding means for advancing said chain conveyor to receive successively delivered pirns in consecutive adjacent trough elements of said conveyor portion, and actuating means operative upon the advancement of said conveyor portion corresponding to the filling of said holding means to its capacity, said actuating means being connected to be operated by said drive means, said actuating means being further connected to displace said closure member for operation of said transfer means and for operation of said stepwise actuated means for filling successive transverse rows of the pins of said rack.

6. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a regularly spaced longitudinally extending series of transverse rows of regularly spaced upright pins carried by a base plate, said apparatus comprising a machine frame including a runway for longitudinally movably supporting and guiding a plurality of said racks in abutting end-to-end relationship therein, stepwise actuated means for advancing said racks longitudinally of said supporting means, said stepwise actuated means including a plurality of latch means reciprocable longitudinally of said runway, said latch means being spaced longitudinally of said runway for simultaneous engagement with said upright pins of different ones of said abutting racks, temporary holding means extending transversely above said runway and including a chain conveyor comprising a series of inclined trough elements for recliningly receiving successive pirns from said rewinding machine, each in one of said trough elements, said chain conveyor comprising a portion having a pirn-holding capacity equal to the storage capacity of one of said transverse rows and consisting of a series of trough elements in register with the pirns of said transverse rows, transfer means comprising a movable bottom closure member for said series of trough elements for simultaneously dropping the entire contents of said chain conveyor portion upon a single transverse row of pins of said rack by displacement of said closure member, drive means operating in synchronism with the pirn delivery mechanism of said rewinding machine, said drive means including means connected with said holding means for advancing said chain conveyor to receive successively delivered pirns in consecutive adjacent trough elements of said conveyor portion, and actuating means operative upon the advancement of said conveyor portion corresponding to the filling of said holding means to its capacity, said actuating means being connected to be operated by said drive means, said actuating means being further connected to displace said closure member for operation of said transfer means and for operation of said stepwise actuated means for filling successive transverse rows of the pins of said rack.

7. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they are rewound onto the pirns, the system further comprising a pirn-racking apparatus adapted to receive the series of pirns in the said sequence, and to consecutively deliver them from said individual winding station and to transfer them in said sequence to an elongated storage rack, said rack comprising a regularly spaced longitudinally extending series of transverse rows of regularly spaced pirn-receiving means, said apparatus comprising a machine frame including an elongated runway for longitudinally movably supporting said rack therein, stepwise actuated means for advancing said rack longitudinally of said runway, temporary holding means including a chain conveyor for receiving successive pirns from said rewinding machine, said chain conveyor comprising a portion having a pirn-holding capacity equal to the storage capacity of one of said transverse rows, means including a claw-type slip clutch for advancing said conveyor, transfer means for simultaneously transferring the entire contents of said chain conveyor portion to a single transverse row of said rack, reciprocatory drive means operating in synchronism with the pirn delivery mechanism of said rewinding machine, said drive means including means connected with said holding means through said slip clutch for advancing said chain conveyor to receive successively delivered pirns in consecutive adjacent positions in said conveyor portion, and actuating means operative upon the advancing movement of said conveyor portion by an amount corresponding to the filling of said holding means to its capacity and connected to be operated by said drive means, said actuating means being further connected to operate said transfer means and said stepwise actuated means for filling successive transverse rows of said rack.

8. Apparatus according to claim 7, further comprising counting means interposed between said drive means and said actuating means, said counting means connecting said actuating means for operation by said drive means in response to a predetermined counted number of operations of said drive means producing said advancing movement of said conveyor portion corresponding to said filling of said holding means to its capacity.

9. Pirn racking apparatus of the class described adapted to receive a series of pirns consecutively delivered from a rewinding machine and to transfer said pirns in a predetermined geometric pattern to an elongated storage rack, the position of each pirn in said pattern being determined by the order of its delivery from said rewinding machine, said rack comprising a regularly spaced longitudinally extending series of transverse rows of regularly spaced pirn-receiving means, said apparatus comprising a machine frame including an elongated runway for longitudinally movably supporting said rack therein, stepwise actuated means for advancing said rack longitudinally of said runway, temporary holding means including a chain conveyor for receiving successive pirns from said rewinding machine, said chain conveyor comprising a portion having a pirn-holding capacity equal to the storage capacity equal to the storage capacity of one of said transverse rows, transfer means for simultaneously transferring the entire contents of said chain conveyor portion to a single transverse row of said rack, reciprocatory drive means operating in synchronism with the pirn delivery mechanism of said rewinding machine, a reciprocatory pusher member actuated by said drive means and engageable with the last pirn delivered to said chain conveyor for advancing said conveyor to receive successively delivered pirns in consecutive adjacent positions in said conveyor portion, and actuating means operative upon the advancing movement of said conveyor portion by an amount corresponding to the filling of said holding means to its capacity and connected to be operated by said drive means, said actuating means being further connected to operate said transfer means and said stepwise actuated means for filling successive transverse rows of said rack.

10. Apparatus according to claim 9, further comprising counting means interposed between said drive means and said actuating means, said counting means connecting said actuating means for operation by said drive means in response to a predetermined counted number of operations of said drive means producing said advancing movement of said conveyor portion corresponding to said filling of said holding means to its capacity.

11. Pirn racking apparatus of the class described, adapted to receive a series of pirns consecutively delivered from a rewinding machine and to transfer said pirns in a predetermined arrangement to an elongated storage rack, said rack comprising a base plate with a plurality of upright pins mounted thereon, said pins being arranged in regularly spaced relationship in longitudinally spaced transverse rows, said apparatus comprising a frame including guide means for longitudinally movably receiving and supporting said rack, a temporary holder for receiving successive pirns delivered from said rewinding machine, said holder including a series of trough elements arranged in the form of an endless conveyor chain extending transversely of said guide means and disposed above a rack positioned in said guide means, horizontally spaced generally vertical shafts upon which said conveyor is mounted whereby said trough elements may retain said pirns generally upright therein, a movable bottom member extending across the bottoms of those trough elements in which pirns are retained, means for advancing said conveyor by one trough width at a time, a reciprocatory drive rod adapted to be connected to said rewinding machine for operation in synchronism with the delivery of each pirn thereby, counting mechanism connected to said drive rod, said counting mechanism including a final step member movable during the last step of a pirn-accumulating cycle consisting of a predetermined number of reciprocatory movements of said drive rod, the number of steps in said cycle being equal to the number of trough elements required to be filled in order to fill a single transverse row of said rack, advancing means connected with said drive rod for advancing said conveyor by one step in response to each complete reciprocation of said drive rod, means connected to said final step member of said counting mechanism for withdrawing said bottom member from beneath said pirn-retaining trough elements to discharge said pirns onto a single transverse row of said rack, latch means engageable with said pins and actuated by said final step member of said counting mechanism for advancing said rack longitudinally by one transverse row to position an empty transverse row of pins beneath said pirn-retaining trough elements after the preceding transverse row has been filled.

12. Apparatus according to claim 11, wherein said counting mechanism comprises a series of rotatable disc members coaxially disposed in stacked relationship, said disc members comprising a stepping disc connected for limited reciprocatory angular displacement by said drive rod, a spring-pressed ratchet pawl carried by said stepping disc, a ratchet disc having a series of teeth successively engageable by said ratchet pawl for advancing said ratchet disc, said teeth being equal in number to the number of steps in said pirn-accumulating cycle, a spring-pressed detent for preventing reverse movement of said ratchet disc, a cam disc connected to said ratchet disc, said cam disc having an elongated arcuate recess formed in the periphery thereof, a control disc connected with said final step member for connecting said control member for reciprocatory movement by said drive rod, said control disc having a notch formed in the periphery thereof, and a spring-pressed coupling pawl carried by said stepping disc, said coupling pawl being engageable in said notch to drive said control disc only when said notch and said arcuate recess are in register, the length of said arcuate recess permitting angular displacement of said coupling pawl in said recess only during a single step of said cycle with said ratchet disc held stationary by said detent.

13. Apparatus according to claim 12, wherein said arcuate recess comprises a sloping end edge for expelling said coupling pawl from said notch.

14. Apparatus according to claim 12, further comprising a torque-limiting safety clutch interposed between said drive rod and said stepping disc, said conveyor-advancing means being connected to said stepping disc for operation therewith.

15. Pirn racking apparatus of the class described, adapted to receive a series of hollow-cored pirns consecutively delivered from a rewinding machine and to transfer said pirns in a predetermined arrangement to an elongated storage rack, said rack comprising a base plate with a plurality of upright pins mounted thereon, said pins being arranged in regularly spaced relationship in longitudinally spaced transverse rows, said apparatus comprising a frame including an elongated runway for longitudinally movably receiving a plurality of said racks in abutting end-to-end relationship therein, said runway being open at its ends, a temporary holder for receiving successive pirns delivered from said rewinding machine, said holder extending transversely of said runway, a drive rod adapted to be connected to said rewinding machine for operation in synchronism with a delivery of each pirn thereby, counting mechanism connected to said drive rod, said counting mechanism including a final step member movable during the last step of a pirn-accumulating cycle consisting of a predetermined number of reciprocatory movements of said drive rod, the number of steps in said cycle being equal to the number of pirns required to be delivered to said holder in order to fill a single transverse row of said rack, discharge means connected to said final step member for emptying said holder to discharge said pirns accumulated during said cycle onto a single transverse row of said rack, latch means simultaneously engageable with a plurality of said racks and actuated by said final step member for advancing a plurality of said abutting racks longitudinally by one transverse row of pins to position an empty transverse row beneath said holder after the preceding transverse row has been filled, a transversely extending check member having accurately positioned clearance apertures formed therein for passage of the upper ends of said pins therethrough, said apertures being disposed above said runway ahead of said holder for preventing the passage of said pins unless said pins are correctly aligned to receive pirns from said holder, and maximum force-limiting means interposed between said drive rod and said counting mechanism.

16. Apparatus according to claim 15, further comprising a shield member normally positioned in front of said holder and connected to be displaced by said final step member to clear the way for the advance of the last delivered pirn.

17. Apparatus according to claim 15, further comprising obstructing means disposed behind said check member and actuated by said final step member for preventing the insertion of an empty rack in said runway during the advancing movement of a partially filled rack.

18. Apparatus according to claim 7, further comprising clutch-disengaging means connected to said clutch and operated by said actuating means for suppressing advancing movement of said conveyor when said conveyor has just been emptied.

19. A method comprising rewinding a textile strand from a larger package of the strand to form a sequentially wound series of smaller pirns therefrom, temporarily collecting the pirns in the sequence in which they were wound from the larger package and disposed in the form of a transverse row of spaced, upwardly-downwardly directed pirns, simultaneously transferring the pirns of the row to a pirn-receiving and supporting surface, and advancing the said surface longitudinally for transfer thereto of the next collected row of pirns, whereby the shorter lengths of strand on the pirns are arranged for further processing in the order in which they were wound off the larger package, to minimize the effect of variations in characteristics of the strand in the package.

20. The method of collecting and retaining a plurality of pirns for subsequent use in the order in which they are wound by and delivered from an individual winding station of a winding machine, comprising successively collecting the current output of wound pirns from the individual winding station in said order, whereby the shorter lengths of strand on the pirns are arranged for further processing in the order in which they were wound off the larger package, to minimize the effect of variations in characteristics of the strand in the package, the collected pirns being initially disposed consecutively in a transversely extending row, the pirns in the row extending upwardly-downwardly, dropping the row of collected pirns onto a pirn-receiving and supporting surface to transfer said entire row of collected pirns thereto, and advancing said supporting surface longitudinally for the transfer thereto of the next collected row of pirns.

21. A system comprising a yarn-rewinding machine having an individual rewinding station provided with means for unwinding a yarn from a larger package on said winding station and for rewinding said yarn on a series of pirns sequentially, said rewinding station having a pirn-delivery mechanism for delivering the series of pirns sequentially so that the shorter lengths of yarn provided on the successive pirns delivered by said mechanism are in the same sequence in which they were rewound onto the pirns, the system further comprising a pirn-racking apparatus adapted to receive the series of pirns in the said sequence, and to consecutively deliver them from said individual winding station and to transfer them in said sequence to an elongated storage rack, said pirn-racking apparatus comprising a storage rack having a longitudinally extending series of transverse rows of pirn-receiving means, a transversely movable temporary holding device to receive said pirns sequentially from the winding station, said holding device comprising a conveyor chain of temporary pirn receivers, reciprocable drive rod means connected to said pirn-delivery mechanism to advance said holding device transversely step-wise for reception, by one of the receivers, of a wound pirn from said winding station, said step-wise advance being repeated a number of times required to establish the required number of transverse pirns to form the row, means to advance the storage rack one longitudinal step comprising the distance required to station the next row of transverse row of pirn-receiving means of the rack for reception of a row of pirns from the pirn receivers of the holding device, means to cause transfer of the pirns from the receivers of the holding device to the storage rack.

22. Pirn-racking apparatus to receive the pirn output of an individual winding station on a rewinding machine, said pirns being sequentially rewound from a strand unwound from a larger package on said winding station, the wound pirns being consecutively delivered to the racking apparatus, comprising a storage rack having a longitudinally extending series of transverse rows of pirn-receiving means, a transversely movable temporary holding device to receive said pirns sequentially from the winding station, said holding device comprising a conveyor chain of temporary pirn receivers, operating means for actuating said pirn-racking apparatus in a cyclic series of pirn-accumulating steps, each step of said series occurring when a newly wound pirn is supplied to the racking apparatus from the coil-winding station, the number of the accumulating steps of the cycle being the number of pirns to be racked up in a transverse row of the storage rack, means actuated by the operating means to advance said holding device transversely step-wise for reception of a wound pirn from said winding station, said step-wise advance of the holding device being repeated a number of times required to establish the required number of transverse pirns to form the row, means operative after the next to the last step of the pirn-accumulating cycle to advance the storage rack one longitudinal step, this longitudinal step comprising the distance required to station the next row of transverse row of pirn-receiving means of the rack for reception of a row of pirns from the pirn receivers of the holding device, means to cause transfer of the pirns from the receivers of the holding device to the storage rack, the actuation of said transfer means being initiated prior to the termination of the last step of the pirn-accumulating cycle, means preventing movement of the conveyor chain of pirn receivers of the holding device during the last step of the pirn-accumulating cycle.

23. Pirn-racking apparatus to receive the pirn output of an individual winding station on a rewinding machine, said pirns being sequentially rewound from a strand unwound from a larger package on said winding station, the wound pirns being consecutively delivered to the racking apparatus, comprising a lower storage rack having a longitudinally extending series of transverse rows of pirn-receiving means, an upper transversely movable temporary holding device to receive said pirns sequentially from the winding station, said holding device comprising a conveyor chain of temporary pirn receivers, operating means for actuating said pirn-racking apparatus in a cyclic series of pirn-accumulating steps, each step of said series occurring when a newly wound pirn is supplied to the racking apparatus from the coil-winding station, the number of the accumulating steps of the cycle being the number of pirns to be racked up in a transverse row of the storage rack, means actuated by the operating means to advance said holding device transversely step-wise for reception of a wound pirn from said winding station, said step-wise advance of the holding device being repeated a number of times required to establish the required number of transverse pirns to form the row, means operative after the next to the last step of the pirn-accumulating cycle to advance the storage rack one longitudinal step, this longitudinal step comprising the distance required to station the next row of transverse row of pirn-receiving means of the rack for reception of a row of pirns from the pirn receivers of the holding device, means to cause release of the pirns to drop them from the receivers of the holding device to the storage rack, the actuation of said release means being initiated prior to the termination of the last step of the pirn-accumulating cycle so that the final pirn of the accumulating cycle is only briefly in the holding device, means preventing movement of the conveyor chain of pirn receivers of the holding device during the last step of the pirn-accumulating cycle.

24. Pirn-racking apparatus to receive the pirn output of an individual winding station on a rewinding machine, said pirns being sequentially rewound from a strand unwound from a larger package on said winding station, the wound pirns being consecutively delivered to the racking apparatus, comprising a lower storage rack having a longitudinally extending series of transverse rows of pirn-receiving means, an upper transversely movable temporary holding device to receive said pirns sequentially from the winding station, said holding device comprising a conveyor chain of temporary pirn receivers, operating means for actuating said pirn-racking apparatus in a cyclic series of pirn-accumulating steps, each step of said series occurring when a newly wound pirn is supplied to the racking apparatus from the coil-winding station, the number of the accumulating steps of the cycle being the number of pirns to be racked up in a transverse row of the storage rack, means actuated by the operating means to advance said holding device transversely step-wise for reception of a wound pirn from said winding station, said step-wise advance of the holding device being repeated a number of times required to establish the required number of transverse pirns to form the row, means operative after the next to the last step of the pirn-accumulating cycle to advance the storage rack one longitudinal step, this longitudinal step comprising the distance required to station the next row of transverse row of pirn-receiving means of the rack for reception of a row of pirns from the pirn receivers of the holding device, means to cause release of the pirns to drop them from the receivers of the holding device to the storage rack, the actuation of said release means being initiated prior to the termination of the last step of the pirn-accumulating cycle so that the final pirn of the accumulating cycle is only briefly in the holding device, means preventing movement of the conveyor chain of pirn receivers of the holding device during the last step of the pirn-accumulating cycle, the means to advance the storage rack one longitudinal step comprising a longitudinally reciprocable control rail, a spring-pressed pivoted latch means carried by said rail, said latch means having a portion disposed to push the storage rack step-wise longitudinally to obtain said advancing thereof, the latch means also having a portion disposed to be pushed to pivot the latch out of the path of the storage rack when the rail is moved in the opposite direction to said advance.

25. Pirn racking apparatus of the class described, adapted to receive a series of hollow-cored pirns consecutively delivered from a rewinding machine and to transfer said pirns in a predetermined geometric pattern to an elongated storage rack, the position of each pirn in said pattern being determined by the order of its delivery from said rewinding machine, said rack comprising a regularly spaced longitudinally extending series of transverse rows of regularly spaced upright pins carried by a base plate, said apparatus comprising a machine frame including a runway for longitudinally movably supporting and guiding said rack therein, stepwise actuated means including longitudinally reciprocable latch means engageable with said upright pins for advancing said rack longitudinally of said supporting means, said latch means being operably connected for reciprocation only when the storage rack is to be advanced, temporary holding means extending transversely above said runway and including a chain conveyor comprising a series of inclined trough elements for recliningly receiving successive pirns from said rewinding machine, each in one of said trough elements, said chain conveyor comprising a portion having a pirn-holding capacity equal to the storage capacity of one of said transverse rows and consisting of a series of trough elements in register with the pirns of said transverse rows, transfer means comprising a movable bottom closure member for said series of trough elements for simultaneously dropping the entire contents of said chain conveyor portion upon a single transverse row of pins of said rack by displacement of said closure member, drive means operating in synchronism with the pirn delivery mechanism of said rewinding machine, said drive means including means connected with said holding means for advancing said chain conveyor to receive successively delivered pirns in consecutive adjacent trough elements of said conveyor portion, and actuating means operative upon the advancement of said conveyor portion corresponding to the filling of said holding means to its capacity, said actuating means being connected to be operated by said drive means, said actuating means being further connected to displace said closure member for operation of said transfer means and for operation of said stepwise actuated means for filling successive transverse rows of the pin of said rack, said pirns being delivered to an end trough element of said conveyor portion disposed at a fixed position away from which said conveyor advances, said apparatus further comprising a movable shield disposed at said fixed position for retaining each newly delivered pirn in said end trough element, said shield being connected with said actuating means for movement away from said end trough element to permit advancing movement of said rack with the last-delivered pirn disposed thereon.

26. Pirn racking apparatus of the class described, adapted to receive a series of hollow-cored pirns consecutively delivered from a rewinding machine and to transfer said pirns in a predetermined geometric pattern to an elongated storage rack, the position of each pirn in said pattern being determined by the order of its delivery from said rewinding machine, said rack comprising a regularly spaced longitudinally extending series of transverse rows of regularly spaced upright pins carried by a base plate, said apparatus comprising a machine frame including a runway for longitudinally movably supporting and guiding said rack therein, stepwise actuated means including longitudinally reciprocable latch means engageable with said upright pins for advancing said rack longitudinally of said supporting means, said latch means being operably connected for reciprocation only when the storage rack is to be advanced, temporary holding means extending transversely above said runway and including a chain conveyor comprising a series of inclined trough elements for recliningly receiving successive pirns from said rewinding machine each in one of said trough elements, said chain conveyor comprising a portion having a pirn-holding capacity equal to the storage capacity of one of said transverse rows and consisting of a series of trough elements in register with the pirns of said transverse rows, transfer means comprising a movable bottom closure member for said series of trough elements for simultaneously dropping the entire contents of said chain conveyor portion upon a single transverse row of pins of said rack by displacement of said closure member, drive means operating in synchronism with the pirn delivery mechanism of said rewinding machine, said drive means including means connected with said holding means for advancing said chain conveyor to receive successively delivered pirns in consecutive adjacent trough elements of said conveyor portion, and actuating means operative upon the advancement of said conveyor portion corresponding to the filling of said holding means to its capacity, said actuating means being connected to be operated by said drive means, said actuating means being further connected to displace said closure member for operation of said transfer means and for operation of said stepwise actuated means for filling successive transverse rows of the pins of said rack, and a series of spacer elements carried by said bottom closure member and positioned for lateral engagement with the bases of said pirns during said displacement of said closure member.

References Cited in the file of this patent

UNITED STATES PATENTS

| | | |
|---|---|---|
| 2,675,184 | Abbott et al. | Apr. 13, 1954 |
| 2,676,763 | O'Neill | Apr. 27, 1954 |
| 2,794,532 | Snow | June 4, 1957 |